United States Patent [19]

Marino

[11] Patent Number: 5,049,734
[45] Date of Patent: Sep. 17, 1991

[54] METHOD FOR DETERMINING PETAL PISTON IN A SEGMENTED IMAGING SYSTEM

[75] Inventor: Philip F. Marino, Rochester, N.Y.

[73] Assignee: Eastman Kodak Company, Rochester, N.Y.

[21] Appl. No.: 572,076

[22] Filed: Aug. 23, 1990

[51] Int. Cl.$^5$ .............................................. G01J 1/20
[52] U.S. Cl. ................................ 250/201.9; 359/849; 359/850
[58] Field of Search ...................... 250/201.9; 350/611

[56] References Cited

U.S. PATENT DOCUMENTS 4,518,854  5/1985  Hutchin ........................... 250/201.9
4,959,532  9/1990  Owechko ........................ 250/201.9

FOREIGN PATENT DOCUMENTS

WO88/09488 12/1988 PCT Int'l Appl. .............. 250/201.9

Primary Examiner—David C. Nelms
Assistant Examiner—Que T. Le
Attorney, Agent, or Firm—Stephen C. Kaufman

[57] ABSTRACT

A method for determining petal piston in a segmented optical imaging system. The system preferably comprises a center mirror and a set of P petals adjacent to the center mirror. The novel method is suitable for determining petal piston for each of the P petals, with respect to the center mirror, or with respect to each other. To this end, the novel method employs a three-part masking scheme, to simulate zero, positive and negative piston error, in order to develop a referrent as a measure of actual piston error.

7 Claims, 5 Drawing Sheets

METHOD FOR DETERMINING PETAL PISTON IN A SEGMENTED IMAGING SYSTEM

FIELD OF THE INVENTION

This invention relates to a method for determining petal piston in a segmented imaging system.

INTRODUCTION TO THE INVENTION

I am working on a segmented imaging system, in particular, a segmented optical imaging system, of the type shown in FIG. 1. The FIG. 1 segmented optical imaging system (numeral 10), comprises a center mirror segment 12, and a set of six mirror segments, or petals (numerals 14-24). The petals (14-24) circumscribe the center mirror segment 12. The segmented optical imaging system 10 (hereinafter, optical system 10) may be employed to input scene radiation, for example, light from a star, and re-image the input scene radiation at a unique focal point.

One measure of the quality of the FIG. 1 optical system 10 is its ability to sharply re-image the scene radiation at the focal point. This concept is developed with reference to FIGS. 2A,B.

FIG. 2A provides a partial edge-view of the FIG. 1 optical system 10, and, accordingly, shows the center mirror segment 12, an adjacent petal 14, a system 10 optical axis 26, and a focal point 28 located on the optical axis 26.

Now, the quality of the FIG. 2A optical system 10 can be optimized to the extent that the center mirror segment 12 and the petal 14 define a continuous surface curvature, so that incoming radiation to the optical system 10, shown by arrows, may be uniquely returned to the focal point 28 by the tandem operation of the center mirror segment 12 and the petal 14. In other words, to the extent that the incoming scene radiation is uniquely returned to the focal point 28, the input scene radiation may be sharply re-imaged.

Attention is now directed to FIG. 2B, which, compared to the FIG. 2A arrangement, shows the center mirror segment 12 and petal 14 translationally displaced, parallel to the optical axis 26, with a displacement (D) being either a positive or negative amount (shown by dotted lines). This positive or negative translational displacement (D) is called petal piston. The FIG. 2B translational displacement or piston defines a *discontinuous* surface curvature, so that incoming radiation to the FIG. 2B optical system 10, shown by arrows, is not, in entirety, uniquely returned to the focal point 28 by the tandem operation of the center mirror segment 12 and the petal 14. This, in turn, induces an undesirable, blurred, non-sharp, re-image of the input scene radiation.

This last situation may be restated: the relative translational displacement of the center mirror segment 12 and the petal 14 (as well as any relative translational displacement of any one petal vis. a vis. any second petal), may be defined to be a measure of the amount of piston error in the segmented optical system, and accordingly, becomes a measure of the quality of the optical system 10.

SUMMARY OF THE INVENTION

Although the problem of petal piston error, as suggested by the above discussion, is theoretically understood, I know of no commercially available piston sensor generators or devices that are suitable to the end of sensing, measuring and correcting petal piston error. It may be surmised that one reason for this lack of problem solution is the fact that segmented optical systems, of the type shown in FIGS. 1-2, are relatively new.

This problem of petal piston error is now addressed and solved by a novel method of the present invention. The novel method is suitable for use in an imaging system for imaging scene radiation. The imaging system preferably comprises a center mirror and a set of P petals adjacent to the mirror. The novel method for determining petal piston for each of the P petals, with respect to the center mirror, or with respect to each other, comprises the steps of:

1) separating scene radiation into replicate first, second and third scene radiation beams;
2) processing the first scene radiation beam by
   (i) dividing the first scene radiation beam into p discrete beams, in correspondence to p areas of the imaging system, such that each area p overlaps a portion of one of the P petals and a portion of the center mirror;
   (ii) adding or subtracting zero path length difference to that component of each of the p discrete beams that exits the petal relative to that component which exits the center mirror, for creating p discrete zero piston beams; and
   (iii) outputting the p discrete zero piston beams;
3) processing the second scene radiation beam by
   (i) dividing the second scene radiation beam into p discrete beams, in correspondence to p areas of the imaging system, such that each area p overlaps a portion of one of the P petals and a portion of the center mirror;
   (ii) adding path length to that component of each of the p discrete beams that exits the petal relative to that component which exits the center mirror, for creating p discrete positive piston beams; and
   (iii) outputting the p discrete positive piston beams;
4) processing the third scene radiation beam by
   (i) dividing the third scene radiation beam into p discrete beams, in correspondence to p areas of the imaging system, such that each area p overlaps a portion of one of the P petals and a portion of the center mirror;
   (ii) adding path length to that component of each of the p discrete beams that exits the center mirror relative to that component which exits the petal, for creating p discrete negative piston beams; and
   (iii) outputting the p discrete negative piston beams;
5) photodetecting each of the p discrete zero piston beams, for measuring p discrete variance of intensity magnitudes;
6) photodetecting each of the p discrete positive piston beams, for measuring p discrete variance of intensity magnitudes;
7) photodetecting each of the p discrete negative piston beams, for measuring p discrete variance of intensity magnitudes; and
8) determining petal piston for each of the P petals by
   (i) generating a petal parabolic function by specifying at least three independent variables derived from steps 5, 6 and 7 respectively, the variables thus comprising the magnitudes of the variance of intensity of the zero, positive, and negative piston beams; and
   (ii) computing a parabolic function maximum as a measure of petal piston.

The novel method of the present invention, as defined, has several important advantages. For example, it requires no moving parts, and it can determine petal piston efficiently and simply. Further, the method is "passive", in the sense that no radiation is generated internal to the imaging system, thus minimizing heat generation and power consumption.

BRIEF DESCRIPTION OF THE DRAWING

The invention is illustrated in the accompanying drawing, in which.

DETAILED DESCRIPTION OF THE INVENTION

A detailed description of the novel method of the present invention, as summarized above, is now set forth, and includes a sequential elaboration of preferred aspects of the preamble and steps of the novel method. Note that as the method steps are sequentially elaborated, preferred structural optical components that may be used to realize the method steps, are themselves sequentially disclosed.

Preamble

Figure 1:
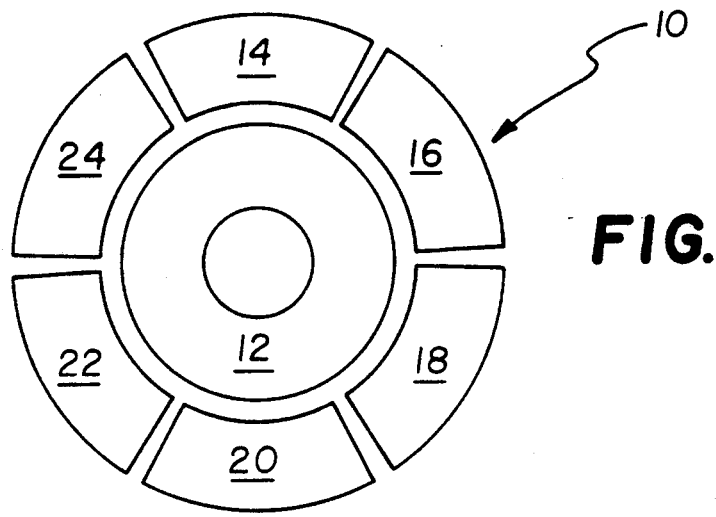
FIG. 1 shows a segmented optical imaging system.
Figure 2A:
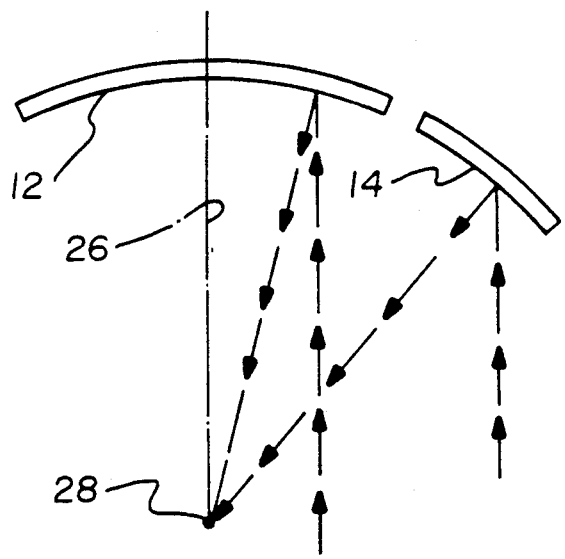
FIGS. 2A,B show edge-views of the FIG. 1 segmented optical imaging system.
Figure 2B:
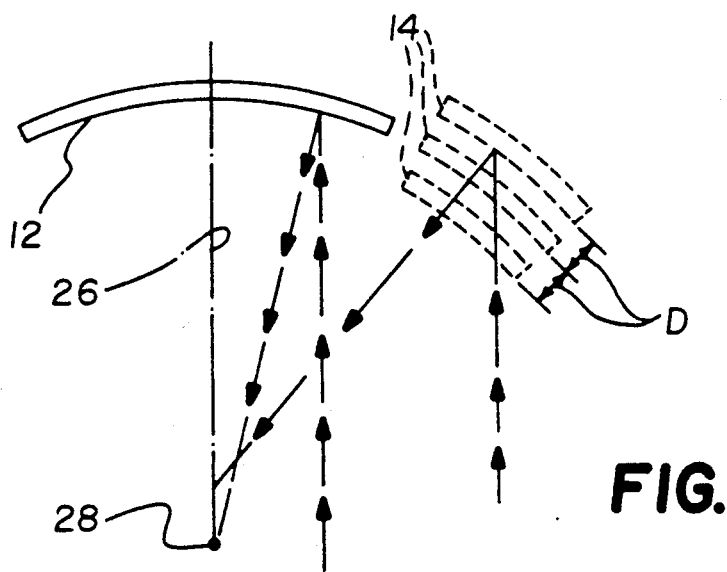
Figure 3:
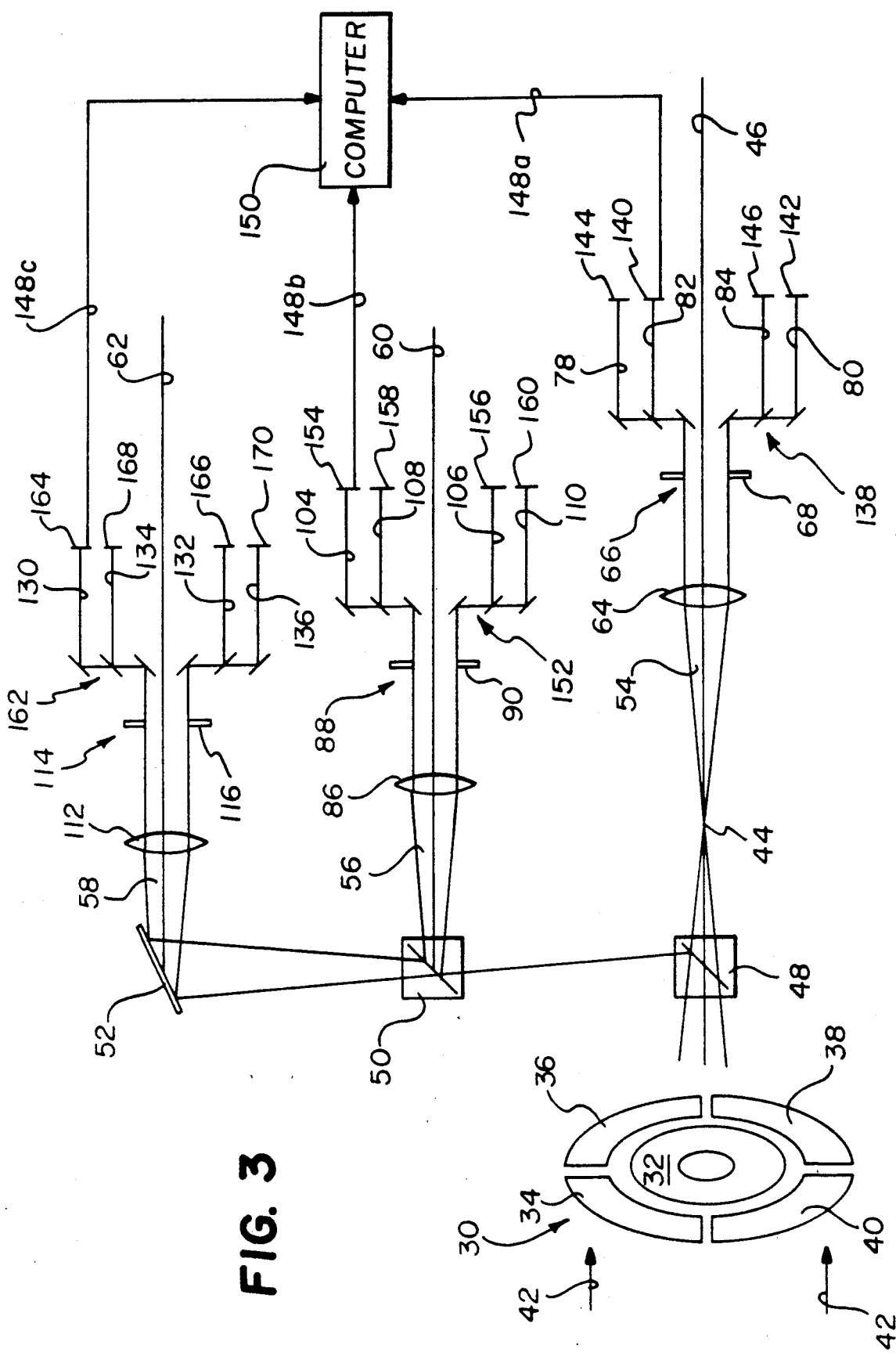
FIG. 3 shows a preferred segmented optical imaging system that may be used in conjunction with the method of the present invention.

An imaging system for imaging scene radiation comprising a center mirror and a set of P petals adjacent to the center mirror Attention is directed to FIG. 3, which shows a representative segmented optical imaging system 30 that may be used in conjunction with the method of the present invention. The system 30 comprises a center mirror segment 32, and a set of four circumscribed mirror segments, or petals (numerals 34-40). The system 30 may be employed to input scene radiation, shown by arrows 42, and to re-image the input scene radiation 42 (by way of a secondary mirror, not shown) at a prime focus 44, located on a system optical axis 46.

Note, firstly, that the FIG. 3 system 30 comprises an optical imaging system. However, the method of the present invention may be used, with appropriate modifications, to encompass other imaging systems, dedicated to other portions of the electromagnetic spectrum, for example, the microwave spectrum. Second, although four petals are shown, the method generally embraces P petals, where P may be any finite number. Further, although FIG. 3 shows a center mirror segment and mirror petals, the method may be employed to cover different types of components, for example, lenses or diffraction gratings, where appropriate. Finally, the method may be employed for determining petal piston error for each of the petals, with respect to the center mirror segment 32, or with respect to each other, including the case where the imaging system only comprises petals.

Step 1: Separating scene radiation into replicate first, second and third scene radiation beams.

The FIG. 3 system 30 preferably comprises conventional first and second beamsplitters (numerals 48, 50), and a conventional fold mirror 52, for separating the input scene radiation 42 into first, second and third scene radiation beams, numerals 54-58, respectively. The beamsplitters 48, 50 and fold mirror 52 preferably create three radiation beams of equal energy. The beamsplitters 48, 50 and fold mirror 52 are preferably positioned near the prime focus 44, and in an unused area of the radiation field.

The first scene radiation beam 54 exits the beamsplitter 48 and continues along the optical axis 46, for subsequent treatment in accordance with step 2, as disclosed below. The second and third scene radiation beams 56, 58 exit the beamsplitter 50 and fold mirror 52, respectively, and continue along optical axes 60, 62 respectively, for subsequent treatment in accordance with steps 3 and 4, respectively, as disclosed below.

Step 2: Processing the first scene radiation beam by:

(i) dividing the first scene radiation beam into p discrete beams, in correspondence to p areas of the imaging system, such that each area p overlaps a portion of one of the P petals and a portion of the center mirror;

(ii) adding or subtracting zero path length difference to that component of each of the p discrete beams that exits the petal relative to that component which exits the center mirror, for creating p discrete zero piston beams; and (iii) outputting the p discrete zero piston beams.

With continued reference to FIG. 3, step 2, as defined, requires processing the first scene radiation beam 54. To optimize this step, a preliminary procedure is preferably first utilized. Namely, a conventional high quality relay, Preferably comprising a single lens 64, is first imposed, along the optical axis 46, in order to relay the first scene radiation beam 54. This action is such as to produce a well-defined, accessible exit pupil (at a point 66), so that the step 2 processing can readily act upon a re-image of the segmented mirror 32 and associated petals (34-40). A readily accessible, clean exit pupil 66 is preferably 1.0 to 3.0 inches in diameter.

The step 2 processing, accordingly, preferably occurs at the exit pupil 66. The step 2 processing, as summarized above by Roman numerals (i), (ii), (iii), requires three-fold "dividing", "adding", and "outputting" functions. These functions are preferably provided by a single unit pupil mask, comprising three sub-components, of the type shown in FIG. 4, as numeral 68.

Figure 4:
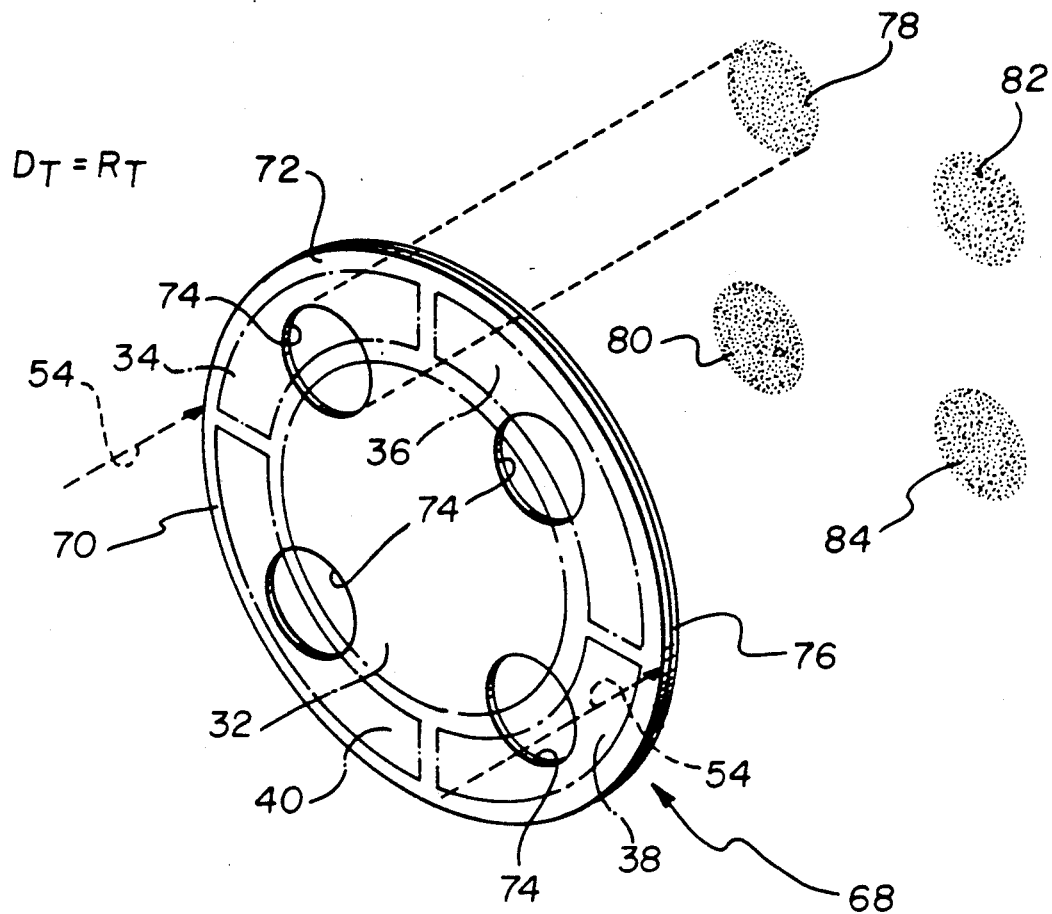
FIG. 4 shows an exploded view of a zero piston beam generator.

The FIG. 4 pupil mask 68 preferably comprises a first sub-component comprising an entrance face 70. The entrance face 70 circumscribes a radius that is in correspondence to the radius of the FIG. 3 center mirror segment 32 and its circumscribed petals (34-40). The pupil mask 68 entrance face 70 comprises an opaque region 72, and a set of 4 transparent, aperture regions 74. The aperture regions 74 each have a predetermined geometry, preferably circular, of diameter approximately 1/5 of the FIG. 3 system 30 maps, to the FIG. 3 system 30, such that each aperture region 74 overlaps a portion of the center mirror segment 32 and a portion of a corresponding petal (34-40).

The net effect of the first sub-component of the FIG. 4 mask 68 entrance face 70, as described, is that it can provide the first of the step 2 functions, namely, dividing the first scene radiation beam 54 into p=4 discrete beams, in correspondence to p=4 areas of the imaging system 30, such that each area p=4 overlaps a portion of one of the P=4 petals (34-40), and a portion of the center mirror 32.

The second sub-component of the pupil mask 68 is dedicated to the second Roman numeral (ii) adding function viz., adding or subtracting zero path length difference to that component of each of the p discrete beams that exits the petal relative to that component which exits the center mirror, for creating p discrete zero piston beams. To this end, the second sub-component preferably comprises a uniform piece of conventional isotropic glass, positioned adjacent to the pupil mask 68 entrance face 70. Such a second sub-component comprising glass is shown in FIG. 4, as numeral 76.

Note that the function of the second sub-component is to add zero path length difference, and that this may be realized by simply passing the p discrete beams through air, instead of the uniform piece of isotropic glass 76.

The third sub-component of the pupil mask 68 is dedicated to the third Roman numeral (iii) outputting function. As shown in FIGS. 3 and 4, the tandem operation of the entrance face 70 aperture regions 74 and glass sub-component 76, inherently cooperate to output a required discrete (p=4) zero piston beams, numerals (78-84).

Step 3: Processing the second scene radiation beam by
  (i) dividing the second scene radiation beam into p discrete beams, in correspondence to p areas of the imaging system, such that each area p overlaps a portion of one of the P petals and a portion of the center mirror;
  (ii) adding path length to that component of each of the p discrete beams that exits the petal relative to that component which exits the center mirror, for creating p discrete positive piston beams; and
  (iii) outputting the p discrete positive piston beams.

Step 3, as defined, and with continued reference to FIG. 3, requires processing the second scene radiation beam 56. To optimize this step, a preliminary procedure is preferably first utilized. Namely, a conventional high quality relay, preferably comprising a single lens 86, is first imposed, along the optical axis 60, in order to relay the second scene radiation beam 56. This action is such as to produce a well-defined, accessible exit pupil (at a point 88), so that the step 3 processing can readily act upon a re-image of the segmented mirror 32 and associated petals (34-40) A readily accessible, clean exit pupil 88 is preferably 1.0 to 3.0 inches in diameter.

The step 3 processing, accordingly, preferably occurs at the exit pupil 88. The step 3 processing, as summarized above by Roman numerals (i), (ii), (iii), requires three-fold "dividing", "adding", and "outputting" functions. These functions are preferably provided by a single unit pupil mask, comprising three sub-components, of the type shown in FIG. 5, as numeral 90.

Figure 5:
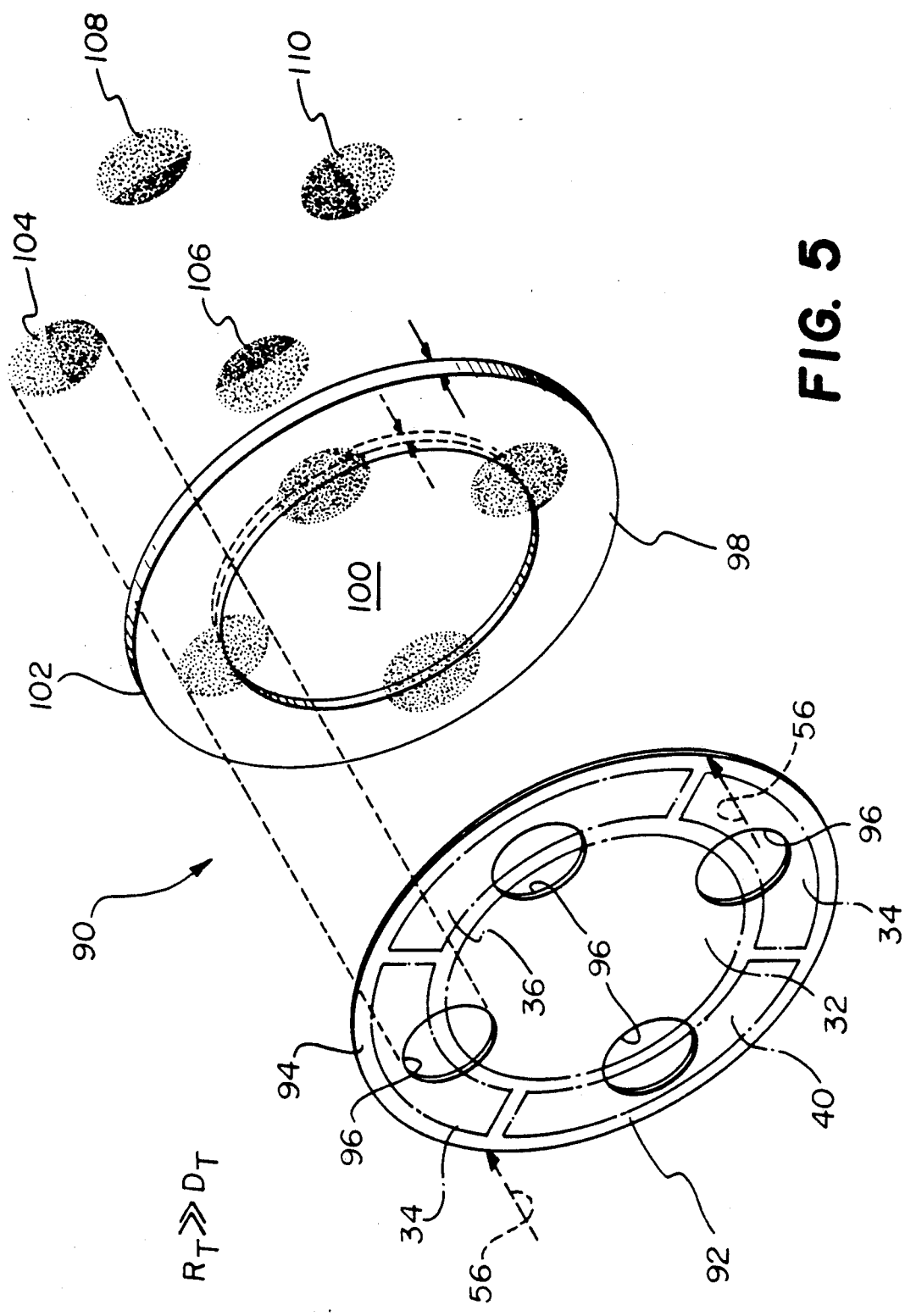
FIG. 5 shows an exploded view of a positive piston beam generator.

The FIG. 5 pupil mask 90 preferably comprises a first sub-component comprising an entrance face 92. The entrance face 92 circumscribes a radius that is in correspondence to the radius of the FIG. 3 center mirror segment 32 and its circumscribed petals (34-40). The pupil mask 90 entrance face 92 comprises an opaque region 94, and a set of 4 transparent, aperture regions 96. The aperture regions 96 each have a predetermined geometry, preferably circular, of diameter approximately 1/5 of the FIG. 3 system 30 aperture. Each aperture region 96 corresponds, or maps, to the FIG. 3 system 30, such that each aperture region 96 overlaps a portion of the center mirror segment 32 and a portion of a corresponding petal (34-40).

The net effect of the first sub-component of the FIG. 5 pupil mask 90 entrance face 92, as described, is that it can provide the first of the step 3 functions, namely, dividing the second scene radiation beams 56 into p=4 discrete beams, in correspondence to p=4 areas of the imaging system 30, such that each area (p=4) overlaps a portion of one of the P=4 petals (34-40), and a portion of the center mirror 32.

The second sub-component of the pupil mask 90 is dedicated to the second Roman numeral (ii) adding function viz., creating p discrete positive piston beams. To this end, the second sub-component Preferably comprises a positive piston generator, of the type shown in the exploded FIG. 5 view as numeral 98, and physically mounted adjacent the entrance face 92.

The positive piston generator 98 comprises an inner disc 100 and an outer ring 102. The inner disc 100 has a radius that maps with the radius of the FIG. 3 center mirror 32. The outer ring 102 circumscribes the inner disc 100, and has an outer radius at least commensurate with the aperture regions 96.

The disc 100 and the ring 102, as suggested above, cooperate to add path length to that component of each of the p discrete beams that exits the petal relative to that component which exits the center mirror. This cooperation may be realized inter alia:

(1) by providing a disc 100 and a ring 102, wherein each comprises isotropic glass, but wherein the thickness of the ring 102 is greater than the thickness of the disc 100;

(2) by providing a disc 100 and a ring 102, wherein each comprises a medium of equal thickness, but of slightly different indices of refraction. For example, a piston generator may comprise a disc and a ring, each of thickness 0.010 inches, but with respective indices of 1.500 and 1.502;

(3) by providing a disc 100 and a ring 102, wherein each comprises a medium of equal thickness and index of refraction, but wherein the ring 102 comprises a thin coating that adds path length to a discrete beam passing through it, relative to that component which exits the center mirror. For example, a typical positive optical path length is from $5\mu$ inch to $20\mu$ inch.

The third sub-component of the FIG. 5 pupil mask 90 is dedicated to the third Roman numeral (iii) outputting function. As shown in FIGS. 3 and 5, the tandem operation of the entrance face 92 aperture regions 96 and the positive piston generator 98, inherently cooperate, to output a required discrete (p=4) positive piston beams, numerals (104-110).

Step 4: Processing the third scene radiation beam by
  (i) dividing the third scene radiation beam into p discrete beams, in correspondence to p areas of the imaging system, such that each area p overlaps a portion of one of the P petals and a portion of the center mirror;
  (ii) adding path length to that component of each of the p discrete beams that exits the center mirror relative to that component which exits the petal, for creating p discrete negative piston beams; and
  (iii) outputting the p discrete negative piston beams.

With continued reference to FIG. 3, step 4, as defined, requires processing the third scene radiation beam 58. To optimize this step, a preliminary procedure is preferably first utilized. Namely, a conventional high quality relay, preferably comprising a single lens 112, is first imposed, along the optical axis 62, in order to relay the third scene radiation beam 58. This action is such as to produce a well-defined, accessible exit pupil (at a point 114), so that the step 4 processing can readily act upon a re-image of the segmented mirror 32 and associated petals (34-40). A readily accessible, clean exit pupil 114 is preferably 1.0 to 3.0 inches in diameter.

The step 4 processing, accordingly, preferably occurs at the exit pupil 114. The step 4 processing, as summarized above by Roman numerals (i), (ii), (iii), requires three-fold "dividing", "adding", and "outputting" functions. These functions are preferably provided by a single unit pupil mask, comprising three sub-components, of the type shown in FIG. 6, as numeral 116.

Figure 6:
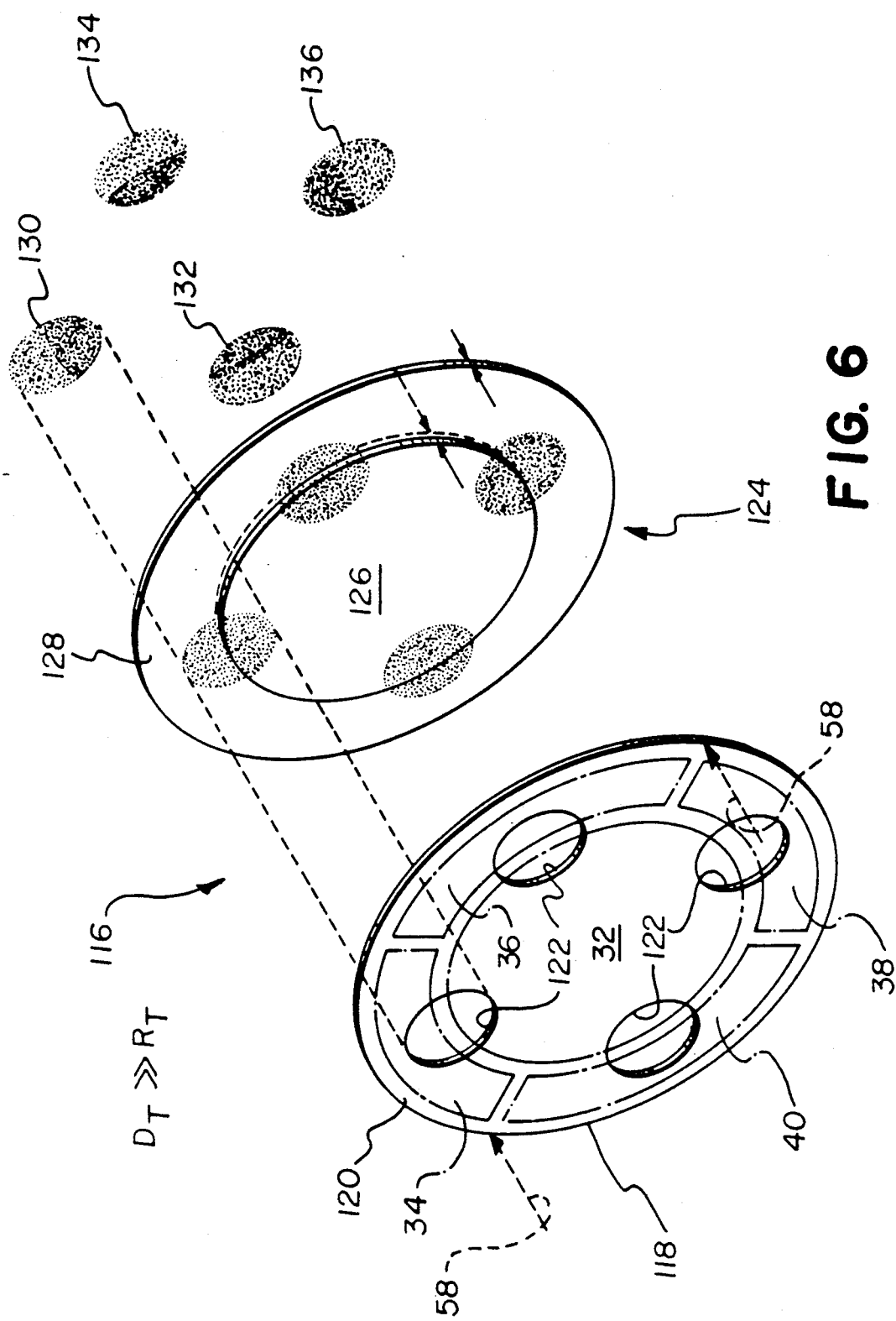
FIG. 6 shows an exploded view of a negative piston beam generator.

The FIG. 6 pupil mask 116 preferably comprises a first sub-component comprising an entrance face 118. The entrance face 118 circumscribes a radius that is in correspondence to the radius of the FIG. 3 center mirror segment 32 and its circumscribed petals (34-40). The pupil mask 116 entrance face 118 comprises an opaque region 120, and a set of 4 transparent, aperture regions 122. The aperture regions 122 each have a predetermined geometry, preferably circular, of diameter approximately 1/5 of the FIG. 3 system 30 aperture. Each aperture region 122 corresponds, or maps, to the FIG. 3 system 30, such that each aperture region 122 overlaps a portion of the center mirror segment 32 and a portion of a corresponding petal (34-40).

The net effect of the first sub-component of the FIG. 6 pupil mask 116 entrance face 118, as described, is that it can provide the first of the step 4 functions, namely, dividing the third scene radiation beam 58 into $p=4$ discrete beams, in correspondence to $p=4$ areas of the imaging system 30, such that each area ($p=4$) overlaps a portion of one of the $P=4$ petals (34-40), and a portion of the center mirror 32.

The second sub-component of the pupil mask 116 is dedicated to the second Roman numeral (ii) adding function viz., creating p discrete negative piston beams. To this end, the second sub-component preferably comprises a negative piston generator, of the type shown in the exploded FIG. 6 view as numeral 124, and physically mounted adjacent the entrance face 118.

The negative piston generator 124 comprises an inner disc 126 and an outer ring 128. The inner disc 126 has a radius that maps with the radius of the FIG. 3 center mirror 32. The outer ring 128 circumscribes the inner disc 126, and has an outer radius at least commensurate with the aperture regions 122.

The disc 126 and ring 128, as suggested above, cooperate, to add path length to that component of each of the p discrete beams that exits the center mirror relative to that component which exits the petal. This cooperation may be realized inter alia:

(1) by providing a disc 126 and a ring 128, wherein each comprises isotropic glass, but wherein the thickness of the disc 126 is greater than the thickness of the ring 128;

(2) by providing a disc 126 and a ring 128, wherein each comprises a medium of equal thickness, but of slightly different indices of refraction. For example, a negative generator may comprise a ring and a disc, each of thickness 0.010 inches, but with negative indices of 1.500 and 1.502, respectively;

(3) by providing a disc 126 and a ring 128, wherein each comprises a medium of equal thickness and index of refraction, but wherein the disc 126 comprises a thin coating that adds path length to a discrete beam passing through it, relative to that component which exits the petal. For example, a typical negative optical path length is from $5\mu$ inch to $20\mu$ inch.

The third sub-component of the FIG. 6 pupil mask 116 is dedicated to the third roman numeral (iii) outputting function. As shown in FIGS. 3 and 6, the tandem operation of the entrance face 118 aperture regions 122 and the negative piston generator 124, inherently cooperate, to output a required discrete ($p=4$) negative piston beams, numerals (130-136).

Step 5: Photodetecting each of the p discrete zero piston beams, for measuring p discrete variance of intensity magnitudes.

It is recalled from FIGS. 3, 4 and step 2, supra, that the pupil mask 68 functions to output $p=4$ discrete zero piston beams (78-84). The step 2 zero piston beams (78-84) are now further processed in accordance with the step 5 photodetecting action.

It is first noted that, in order to facilitate this photodetecting action, a conventional beam diverter assembly 138 comprising pairs of small mirrors (or prisms), is preferably interposed along the FIG. 3 optical axis 46, and located just after the pupil mask 68, to the end of re-directing the zero piston beams (78-84) for forming an image on a conventional set of four CCD arrays (numerals 140-146).

The step 5 photodetecting action, accordingly, comprises individually photodetecting each of the ($p=4$) zero piston beams, for measuring ($p=4$) discrete variance of intensity magnitudes. In a typical action, the photodetecting comprises a CCD array comprising approximately $50\mu M$ pixels in a $256 \times 256$ square array. The output of the step 5 photodetecting action, viz., the variance of intensity magnitude, is preferably input along a line 148a (only one line is shown) to a computing means 150, for subsequent processing in accordance with step 8, infra.

Step 6: Photodetecting each of the p discrete positive piston beams, for measuring p discrete variance of intensity magnitudes.

It is recalled from FIGS. 3, 5 and step 3, supra, that the pupil mask 90 functions to output $p=4$ discrete positive piston beams (104-110). The step 3 positive piston beams (104-110) are now further processed in accordance with the step 6 photodetecting action.

It is first noted that, in order to facilitate this photodetecting action, a conventional beam diverter assembly 152 comprising pairs of small mirrors (or prisms), is preferably interposed along the FIG. 3 optical axis 60, and located just after the pupil mask 90, to the end of re-directing the positive piston beams (104-110) for forming an image on a conventional set of four CCD arrays (numerals 154-160).

The step 6 photodetecting action, accordingly, comprises individually photodetecting each of the ($p=4$) positive piston beams, for measuring ($p=4$) discrete variance of intensity magnitudes. In a typical action, the photodetecting comprises a CCD array comprising approximately $50\mu M$ pixels in a $256 \times 256$ square array. The output of the step 6 photodetecting action, viz., the variance of intensity magnitudes, is preferably input along a line 148b to the computing means 150, for subsequent processing in accordance with step 8, infra.

Step 7: Photodetecting each of the p discrete negative piston beams, for measuring p discrete variance of intensity magnitudes.

It is recalled from FIGS. 3, 6 and step 4, supra, that the pupil mask 116 functions to output p=4 discrete negative piston beams (130-136). The step 4 negative piston beams (130-136) are now further processed in accordance with the step 7 photodetecting action.

It is first noted that, in order to facilitate this photodetecting action, a conventional beam diverter assembly 162 comprising pairs of small mirrors (or prisms), is preferably interposed along the FIG. 3 optical axis 62, and located just after the pupil mask 116, to the end of re-directing the negative piston beams (130-136) for forming an image on a conventional set of four CCD arrays (numerals 164-170).

The step 7 photodetecting action, accordingly, comprises individually photodetecting each of the (p=4) negative piston beams, for measuring (=4) discrete variance of intensity magnitudes. In a typical action, the photodetecting comprises a CCD array comprising approximately 50μM pixels in a 256×256 square array. The output of the step 7 photodetecting action, viz., the variance of intensity magnitude, is preferably input along a line 148c to the computing means 150, for subsequent processing in accordance with step 8, infra.

Step 8: Determining petal position for each of the P petals by (i) generating a petal parabolic function by specifying at least three independent variables derived from steps 5, 6 and 7 respectively, the variables thus comprising the magnitudes of the variance of intensity of the zero, positive, and negative piston beams; and (ii) computing a parabolic function maximum as a measure of petal piston.

Step 8 is detailed with reference to FIG. 7, which shows a Parabolic Curve of Variance of Intensity Magnitude (I) versus Petal Piston (P), for one of the FIG. 3 optical system 30 petals, namely, the first petal 34. (The following argument applies, mutatis mutandis, for the other petals 36, 38, 40).

Figure 7:
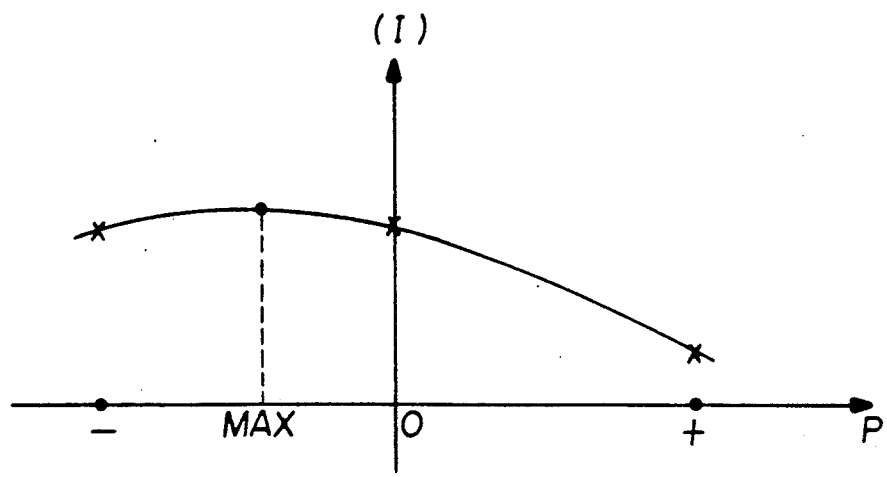
FIG. 7 shows a parabolic function generated in accordance with a method step of the present invention.

FIG. 7 shows a parabolic function that has been generated by specifying three independent variables, derived from steps 5, 6, and 7, supra. (These three independent variables are accessed from the computing means 150.) The three independent variables, accordingly, comprise, for the petal 34, a variance of intensity magnitude registered by the CCD 140, and therefore specifying a zero piston beam intensity; a variance of intensity magnitude registered by the CCD 154, and therefore specifying a positive beam intensity; and, a variance of intensity magnitude registered by the CCD 164, and therefore specifying a negative beam intensity.

FIG. 7 shows these three variance of intensity magnitudes at "locations" 0, +, −, respectively. Further, FIG. 7 shows that a parabolic function has been curve-fitted to these three locations.

The information captured in the FIG. 7 parabolic function may be usefully restated in the following way. The three intensity magnitudes have been severally generated by way of the three masks; namely, the zero-piston pupil mask 68, the positive piston pupil mask 90, and the negative piston pupil mask 116. Accordingly, for the particular petal being interrogated (i.e., the petal 34), two of the three scene images imaged by the masks, have a *known* amount of introduced piston error, while the third scene image imaged by the remaining mask, has *no* piston added. Consequently, by making a scene magnitude contrast, it can be determined that the peak magnitude of the parabolic curve can be used as a measure of petal piston error. For example, in FIG. 7, the peak magnitude of the parabolic curve is denoted $I_{max}$. This peak magnitude is thus a measure of how much the petal 34 must be translationally displaced, to compensate for the piston error.

It is important to note that, although FIG. 7 generates the required parabolic curve on the basis of *three* independent variables, other embodiments, not shown, may specify a greater number of variables. This last procedure optimizes the parabolic curve-fitting procedure.

Finally, note that although FIG. 7 has the required parabolic curve generated on the basis of intensity magnitudes located at the locations (0, +, −), it is to be understood that these are "nominal" locations, in the sense that the required locations could all correspond, for example, to ever greater amounts of negative piston, or ever greater amounts of positive piston. This alternative, in turn, would require a suitable, but straightforward, modification of the "positive" and "negative" piston generators, 98, 124.

I claim:

1. In an imaging system for imaging scene radiation comprising a center mirror and a set of P petals adjacent to the center mirror, a method for determining petal piston for each of the P petals, the method comprising the steps of:

1) separating scene radiation into replicate first, second and third scene radiation beams;

2) processing the first scene radiation beam by
  (i) dividing the first scene radiation beam into p discrete beams, in correspondence to p areas of the imaging system, such that each area p overlaps a portion of one of the P petals and a portion of the center mirror;
  (ii) adding or subtracting zero path length difference to that component of each of the p discrete beams that exits the petal relative to that component which exits the center mirror, for creating p discrete zero piston beams; and
  (iii) outputting the p discrete zero piston beams;

3) processing the second scene radiation beam by
  (i) dividing the second scene radiation beam into p discrete beams, in correspondence to p areas of the imaging system, such that each area p overlaps a portion of one of the P petals and a portion of the center mirror;
  (ii) adding path length to that component of each of the p discrete beams that exits the petal relative to that component which exits the center mirror, for creating p discrete positive piston beams; and
  (iii) outputting the p discrete positive piston beams;

4) processing the third scene radiation beam by
  (i) dividing the third scene radiation beam into p discrete beams, in correspondence to p areas of the imaging system, such that each area p overlaps a portion of one of the P petals and a portion of the center mirror;
  (ii) adding path length to that component of each of the p discrete beams that exits the center mirror relative to that component which exits the petal, for creating p discrete negative piston beams; and
  (iii) outputting the p discrete negative piston beams;

5) photodetecting each of the p discrete zero piston beams, for measuring p discrete variance of intensity magnitude., 6) photodetecting each of the p discrete positive piston beams, for measuring p discrete variance of intensity magnitude;

7) photodetecting each of the p discrete negative piston beams, for measuring p discrete variance of intensity magnitude; and 8) determining petal piston for each of the P petals by
   (i) generating a petal parabolic function by specifying at least three independent variables derived from steps 5, 6 and 7 respectively, the variables thus comprising the magnitudes of the variance of intensity of the zero, positive, and negative piston beams; and
   (ii) computing a parabolic function maximum as a measure of petal piston.

2. A method according to claim 1, wherein step 2 comprises processing the first scene radiation beam at an exit pupil.

3. A method according to claim 2, where step 2 comprises employing a single unit pupil mask comprising dividing, adding and outputting functions for creating discrete zero piston beams.

4. A method according to claim 1, wherein step 3 comprises processing the second scene radiation beam at an exit pupil.

5. A method according to claim 4, wherein step 3 comprises employing a single unit pupil mask comprising dividing, adding and outputting functions for creating discrete positive piston beams.

6. A method according to claim 1, wherein step 4 comprises processing the third scene radiation beam at an exit pupil.

7. A method according to claim 6, wherein step 4 comprises employing a single unit pupil mask comprising dividing, adding and outputting functions for creating discrete negative piston beams.

* * * * *